United States Patent [19]

Schubert

[11] Patent Number: 5,076,533
[45] Date of Patent: Dec. 31, 1991

[54] DEVICE SWIVELLING A UTENSIL RECEPTACLE FOR KITCHEN UTENSILS OR THE LIKE

[75] Inventor: Wolfgang Schubert, Lustenau, Austria

[73] Assignee: Grass AG, Hochst-Vlbg., Austria

[21] Appl. No.: 470,718

[22] Filed: Jan. 26, 1990

[30] Foreign Application Priority Data

Feb. 25, 1989 [DE] Fed. Rep. of Germany ....... 3905880

[51] Int. Cl.⁵ ............................................. F16M 13/00
[52] U.S. Cl. ................................. 248/585; 248/281.1; 312/266
[58] Field of Search ............... 248/564, 575, 578, 585, 248/586, 587, 591, 592, 594, 280.1, 281.1; 312/266; 108/42, 35, 152

[56] References Cited

U.S. PATENT DOCUMENTS

| | | | |
|---|---|---|---|
| 1,119,782 | 12/1914 | Landin | 248/585 |
| 1,285,025 | 11/1918 | Burns | 248/585 |
| 1,711,768 | 5/1929 | Bausch | 248/585 |
| 2,019,083 | 10/1935 | Loftin | 312/266 |
| 2,635,030 | 4/1953 | Stebbins | 312/266 |
| 4,275,942 | 6/1981 | Steidl | 312/266 |
| 4,729,616 | 3/1988 | Vogt | 312/266 |

FOREIGN PATENT DOCUMENTS

| | | | |
|---|---|---|---|
| 659561 | 10/1951 | United Kingdom | 248/585 |
| 965505 | 7/1964 | United Kingdom | 248/585 |
| 1111294 | 4/1968 | United Kingdom | 248/585 |

Primary Examiner—Robert W. Gibson, Jr.
Assistant Examiner—Robert A. Olson

[57] ABSTRACT

A device for swivelling a utensil receptacle for kitchen utensils or the like in parallel with a parallelogram linkage is provided with a cam, and a spring-loaded roller is fitted on the cam of the parallelogram linkage so that the weight of the utensil receptacle, and possibly a kitchen utensil, is offset to the degree desired and preferably substantially equalized, depending on the swivelling angle.

7 Claims, 7 Drawing Sheets

DEVICE SWIVELLING A UTENSIL RECEPTACLE FOR KITCHEN UTENSILS OR THE LIKE

FIELD AND BACKGROUND OF THE INVENTION

The invention relates to a means for swivelling a utensil receptacle for kitchen utensils or the like in parallel with a parallelogram linkage, which is fixed to the housing and mounted on the utensil receptacle.

There are known solutions for rapid kitchen utensil stowage that are based for the most part on placing the utensils in a lower cabinet. The utensils can either be pulled out from under the working panel, which is ergonomically unfavorable due to the low working height, or they are swivelled up from the lower cabinet onto the working panel by means of a suitable mechanism.

Other known solutions make it possible to move objects from the upper cabinet onto the working panel by means of an elevating mechanism.

However, the disadvantage of all these solutions is that the space in kitchen cabinets, which is usually cramped in any case, is reduced even more by the elevating mechanism.

SUMMARY OF THE INVENTION

Based on a means with the features mentioned in the beginning, the object of the invention is thus to develop the means so that the weight of the utensil receptacle including, as necessary, that of the kitchen utensil(s) or the like and the cover is reduced during the swivelling motion, depending on the swivelling angle, so that both swivelling down and swivelling up of the utensil receptacle are made noticeably easier for the person involved. In addition, optimum use is to be made of the space available in a kitchen, and the swivelling motion is to be highly improved ergonomically. If there is a cover for the utensil receptacle, it is to be readily separable from the actual utensil receptacle for cleaning purposes and readily connectable again.

To achieve this object, the invention is characterized in that a spring-loaded roller is provided that is fitted on a cam of the parallelogram linkage.

Only a small amount of force is needed, therefore, to swivel the utensil receptacle down, generally with its cover and with utensils, because the dimensions, particularly the dimensioning of the spring and the shape of the cam as well as the distances both ways, are selected so that the weight is balanced as much as possible for downward swivelling. The weight equalization is eliminated, at least for the most part, just before the end position is reached so that the weight of the utensils and the structural components will cause friction between the cover and the working surface and between the cover and the utensil receptacle. This friction is necessary so that any imbalances occurring during operation of the utensil (kitchen utensil) will not lead to rattling. This rattling is thus prevented by the friction and by the weight. Conditions can also be selected as necessary so that the weight is increased by the spring tension and the cam in a given position such as the swivelled-down position on a working panel.

The ergonomic and space problems are also solved if, as is preferred, the utensil receptacle along with the cover is located below the underside of an upper cabinet and in front of a rear wall when in its swivelled-up position and on a working panel when in its swivelled-down position. Thus, the generally unused space directly below the underside of the upper cabinet is used to store the utensils in their unused rest position.

A separable connection is provided between the utensil receptacle and the cover for convenient cleaning of the latter. The connection will preferably be made by magnetic means.

With this embodiment, a magnet arrangement is swivel-mounted on the utensil receptacle. The swivel feature of the magnet arrangement (permanent magnets) ensures that the magnetic force has the desired effect on the cover in all swivel positions. For this purpose, the cover is provided with a plate containing iron, at least in the area of the magnets, so that a force of attraction will act between the two components to interconnect them when this force is strong enough.

As a protection against contamination, the magnets will preferably be at a distance from the surface of the cover facing them when they are in the connection position.

The magnets are to cooperate with rollers to permit problem-free swivelling of both parts with respect to each other. A sliding system can also be provided, however.

A two-armed lever can be swivel-mounted on the utensil receptacle to separate the two parts from each other, the actuating end of the lever lying on the cover. It is necessary to swivel only the other end of the lever, and the actuating end of the lever will separate the two parts from each other. Generally, a pair of levers is used rather than a single lever; they are connected by a common shaft or two separate levers can also be used.

The invention is explained in more detail below using an example embodiment, which indicates other important features.

BRIED DESCRIPTION OF THE DRAWING

DESCRIPTION OF THE PREFERRED EMBODIMENT

Figure 1:
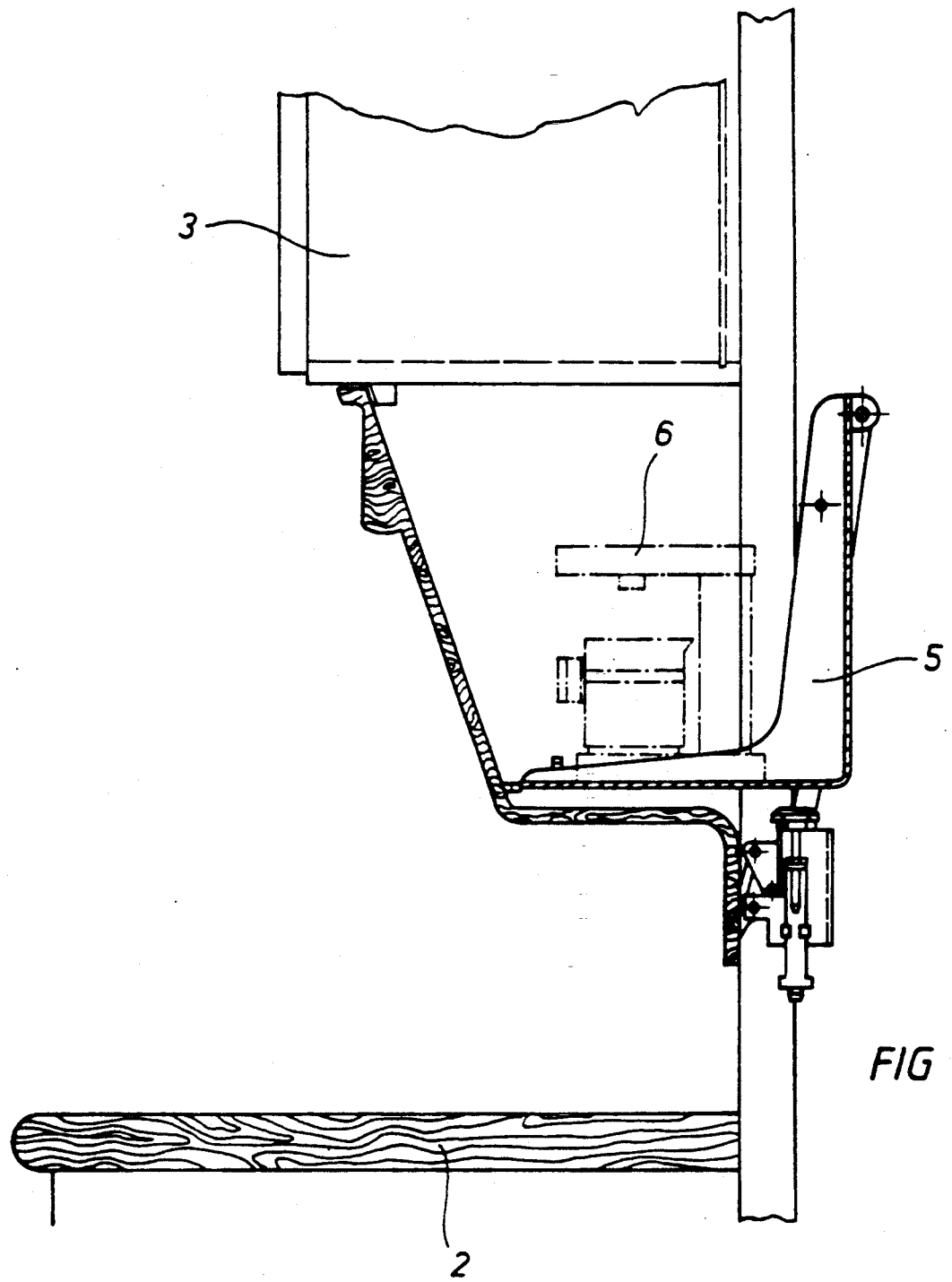
FIG. 1 is a schematic side elevation of a utensil receptacle in its swivelled-up position below an upper cabinet and over a working panel.
Figure 2:
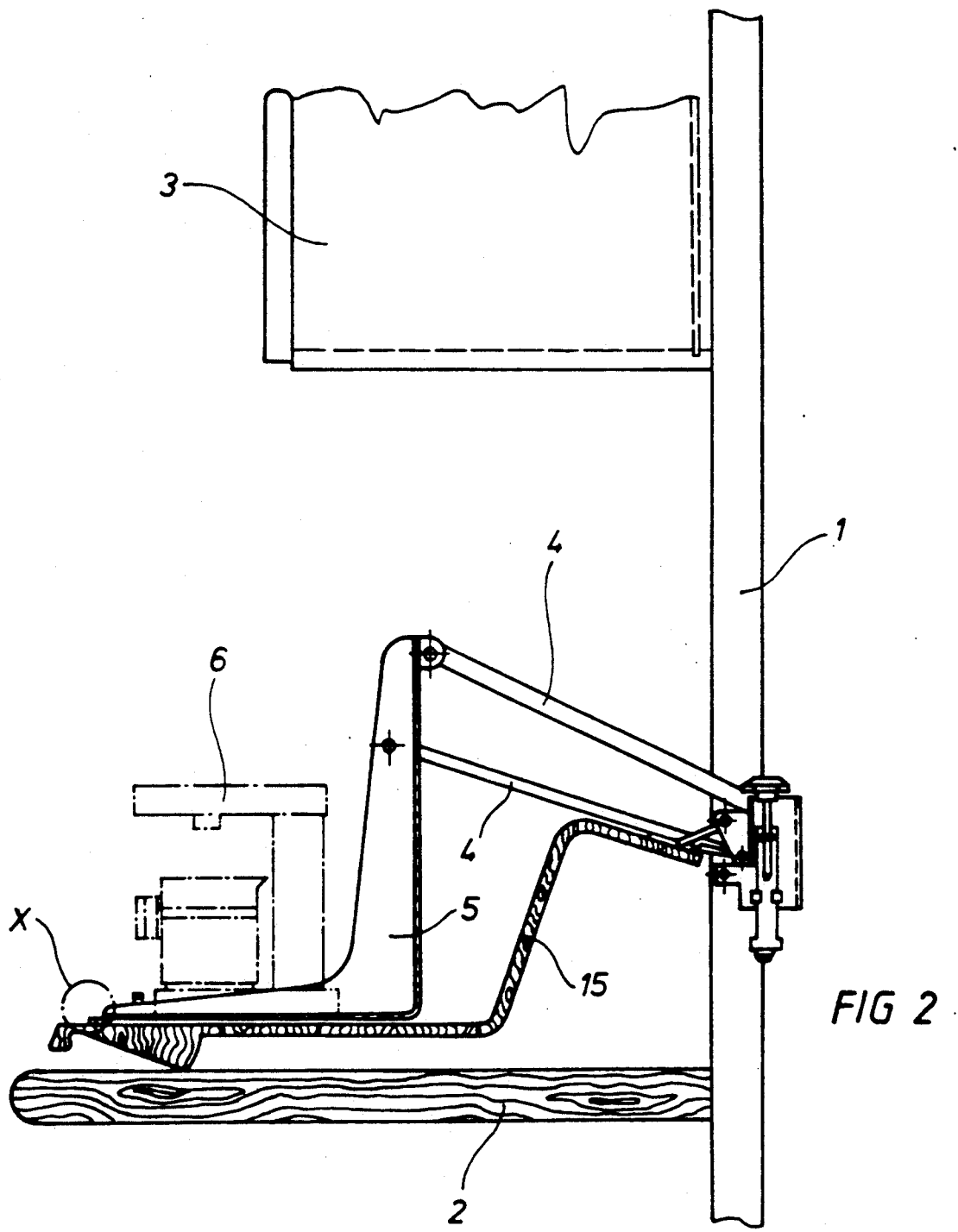
FIG. 2 shows the situation of FIG. 1 in the swivelled-down position of the untensil receptacle.

FIGS. 1 and 2 show a rear wall 1 of a kitchen appliance with a working panel 2 and an upper cabinet 3. A utensil receptacle 5 for a kitchen utensil 6 is swivel-mounted on the rear wall over a parallelogram linkage 4 by means of the invented means, which is explained in more detail below using FIGS. 3 and 4.

The means consists basically of a compression spring 7, the lower end of which lies on a flange 8 of an angle plate 9. The flange 8 and the spring 7 are guided on a mandrell 10.

The upper end of the spring 7 is fitted on a bearing 11 that supports a roller 12, which is in turn fitted on a cam 13 of one of the two levers of the parallelogram linkage 4. The lever rotates around a spindle 14.

There is an offset between the spindle 14 and the point of contact between the roller and the cam. The spring 7 thus generates a force $F_R$ through the roller vertical to the tangent between the roller and the lever curve (cam) 13, this force $F_R$ generating a torque $M_F$ over a distance "a" around a fulcrum D that varies as a function of the lever position. This torque opposes the load torque $M_L$.

Since the load torque around the fulcrum D increases during swivelling down the cam 13 is designed so that the force $F_R$ increasing slightly thereby acts over a greater distance "a". The sum of the torques $M_F$ and $M_L$ add up to approximately zero.

The cam 13 is designed so that the distance "a" becomes very small in order to reduce the torque $M_F$ sharply as desired just before the end position is reached (compare FIG. 2).

It is also posible to design the cam so that the torque $M_F$ is added to the load torque $M_L$.

In order to cover the utensil 6 in the swivelled-up position, a cover 15 is provided on which the utensil receptacle 5 rests in the swivelled-down position. The cover in turn rests on the working panel 2.

Figure 5:
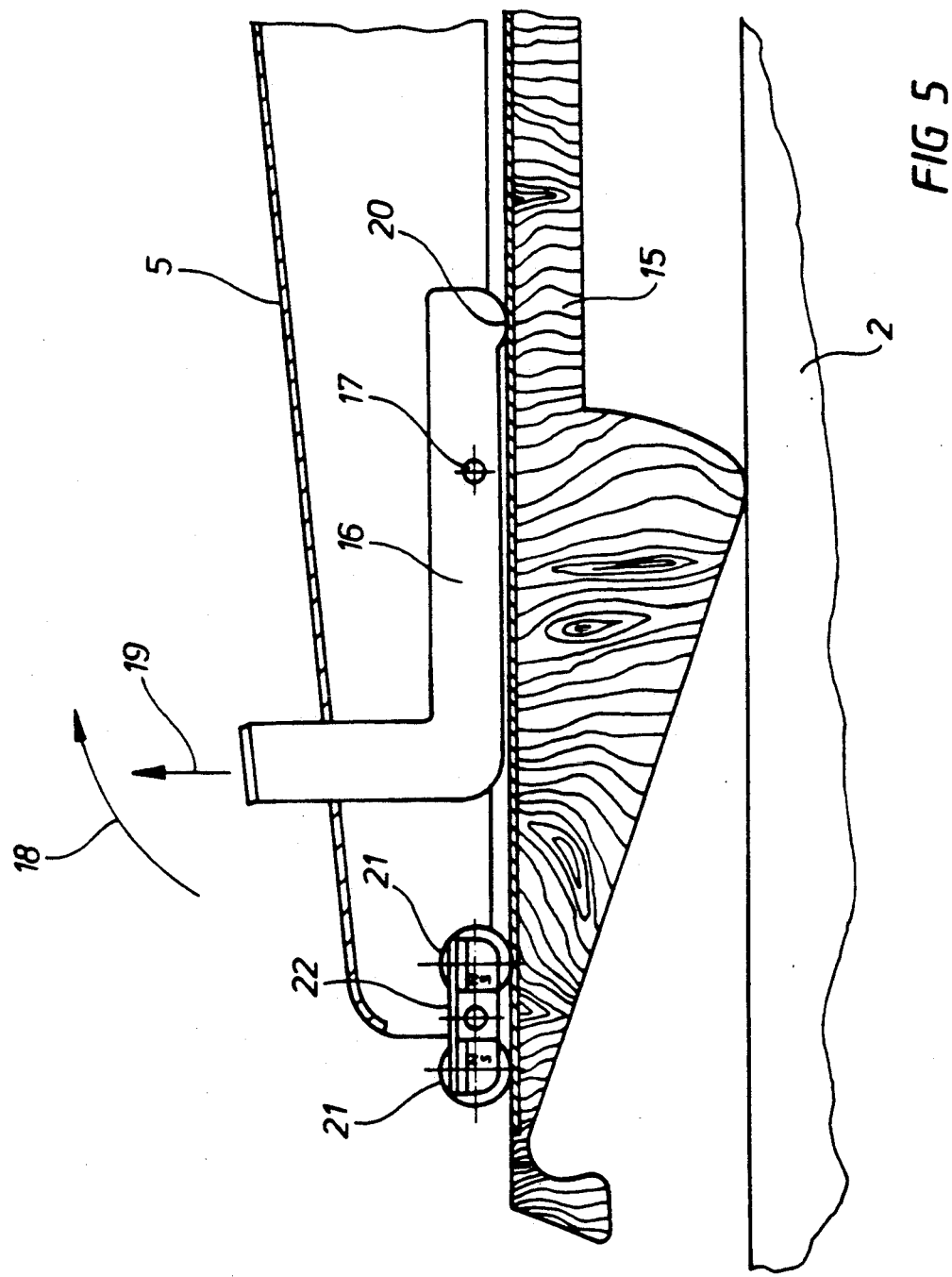
FIG. 5 shows the forward end of the utensil receptacle in the situation according to FIG. 2.

If the utensil receptacle 5 is to be swivelled without the cover 15 into the closing position according to FIG. 1 for cleaning purposes, this can be done by swivelling a lever 16 (compare FIG. 5) around the axis of rotation 17 in the direction of the arrow 18. In general, the lever will be grasped at an offset or the like and lifted in the direction of the arrow 19. A press-off point 20 of the lever resting on the upper side of the cover 15 will now separate the utensil receptacle 5 from the cover 15 because the two parts are connected with each other only by the magnets.

Depending on the spring tension adjusted, the receptacle 5 can, after being lifted a short distance, move automatically toward curshioning limit stops and the end position or require application of only a small amount of force for this purpose.

The cover sitll lying on the working panel can, after cleaning is carried out, be swivelled onto a stop in the upper position, where it is fixed in a known way by holding magnets, for example.

Figure 6:
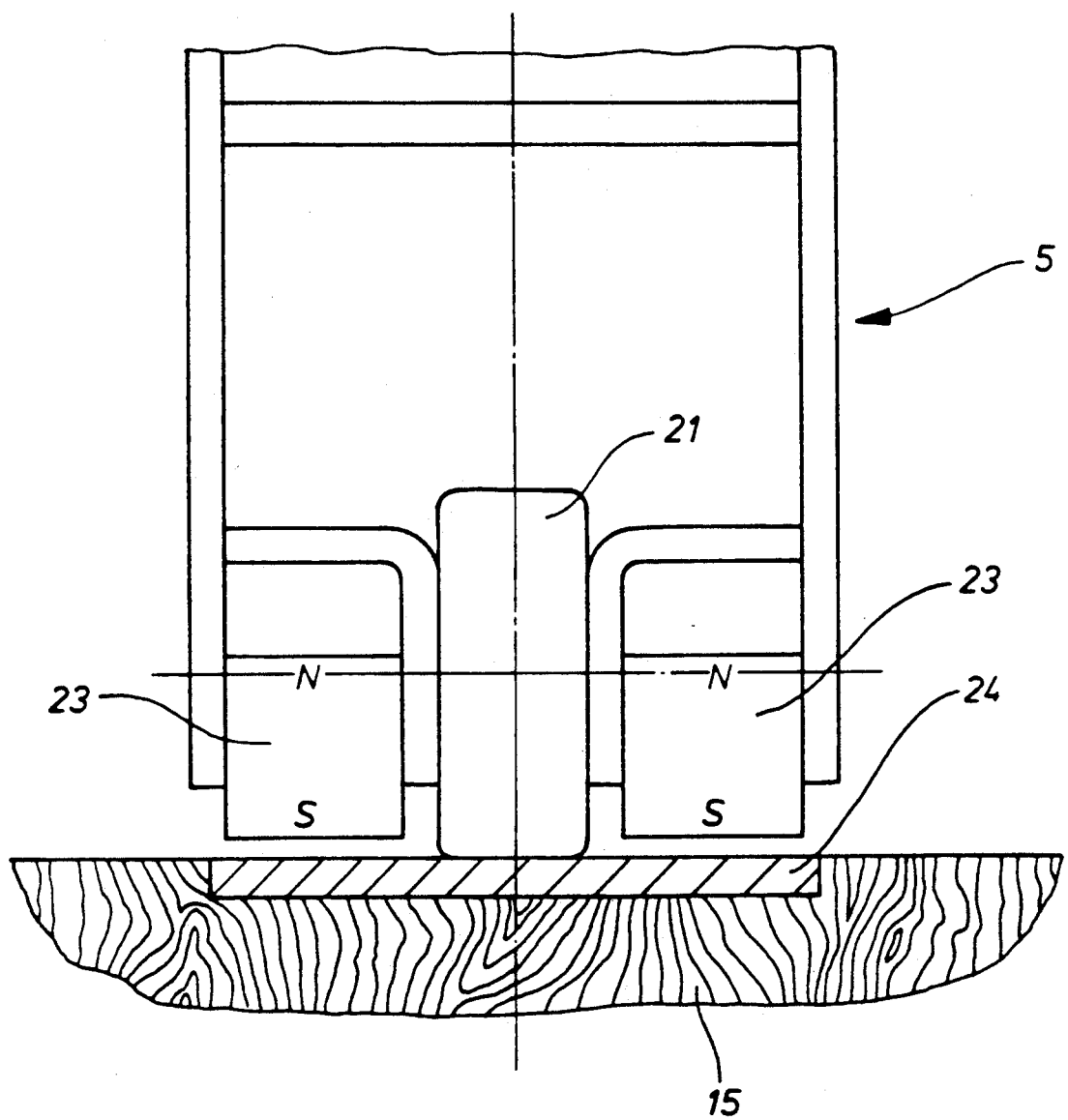
FIG. 6 is the detail of FIG. 2 in a view as seen from the left.
Figure 7:
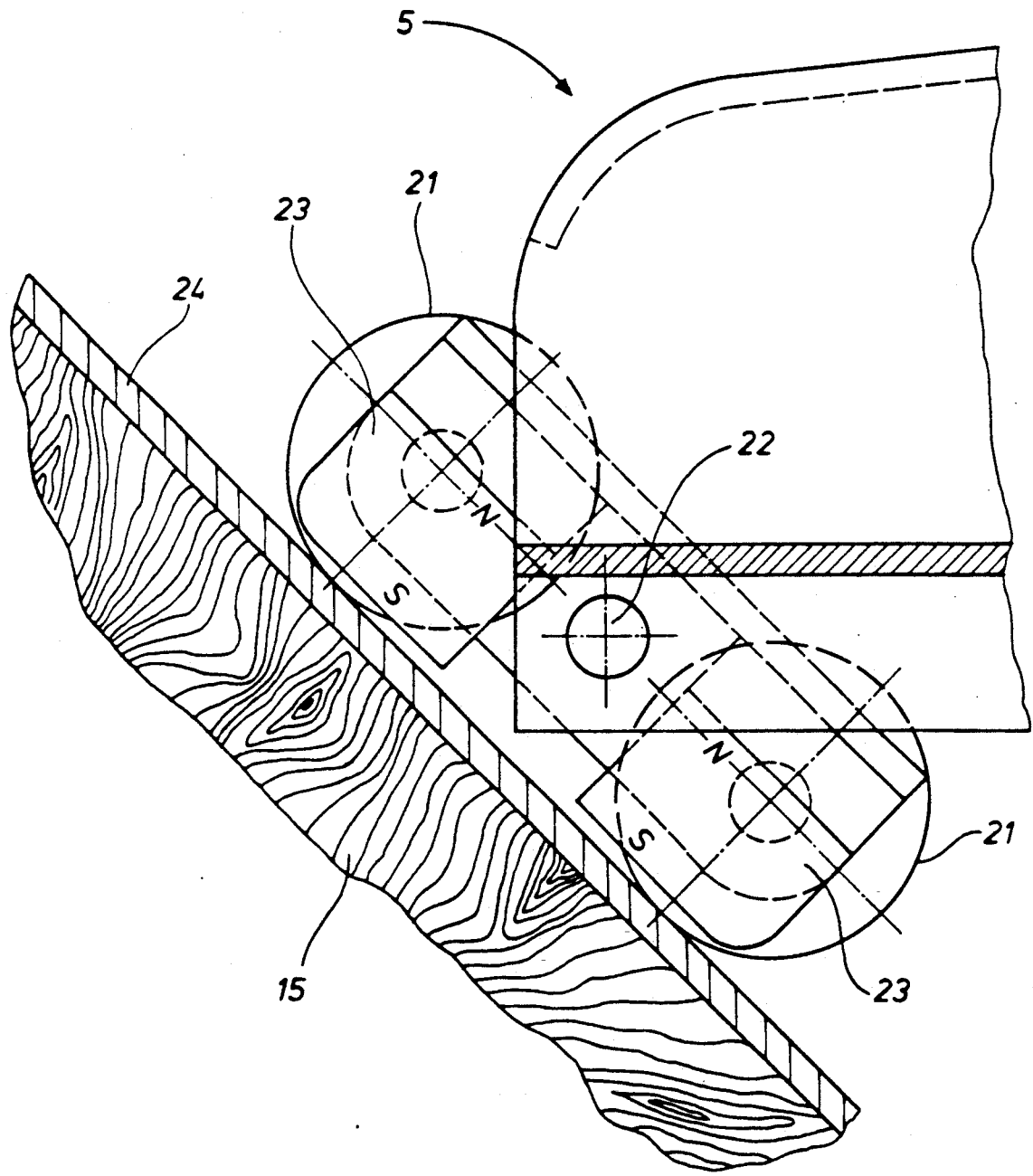
FIG. 7 shows the utensil receptacle with cover in an intermediate position.

Just before the upper position is reached, a swivelling roller-magnet combination (compare FIGS. 5 to 7) is automatically turned on a guideway. A sliding magnet combination can also be provided instead of the roller-magnet combination.

The roller-magnet combination mentioned consists of two rollers 21 swivel-mounted through a spindle 22 on the receptacle 5. They support permanent magnets 23. An iron plate is embedded in the upper side of the cover 15 so that the magnets and the iron plate attract each other and establish the connection between the two parts 5, 15, which can, as mentioned, be separated by the lever mechanism 16.

Figure 3:
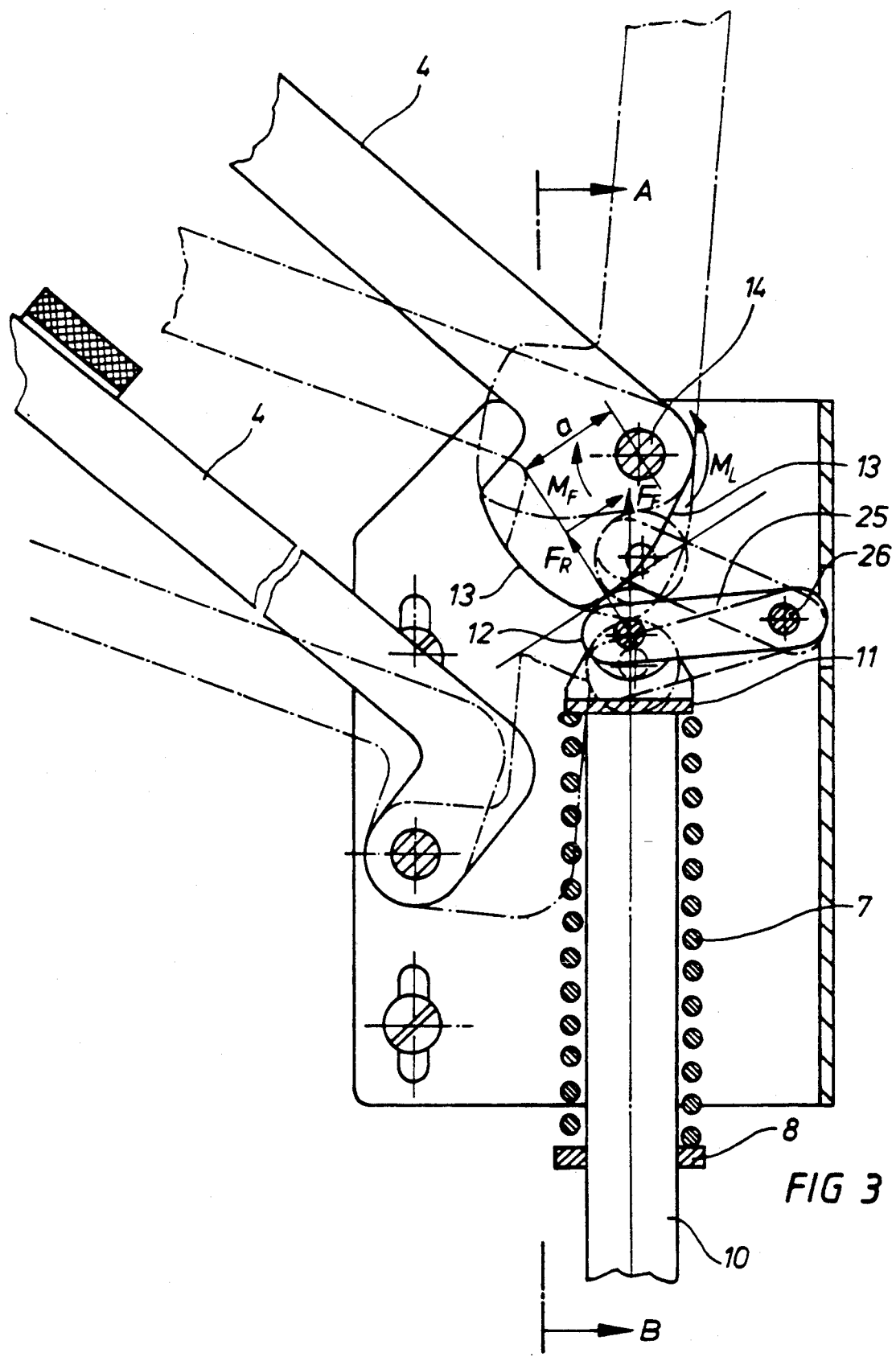
FIG. 3 shows an enlarged side elevation of the invented means corresponding to FIGS. 1 and 2.
Figure 4:
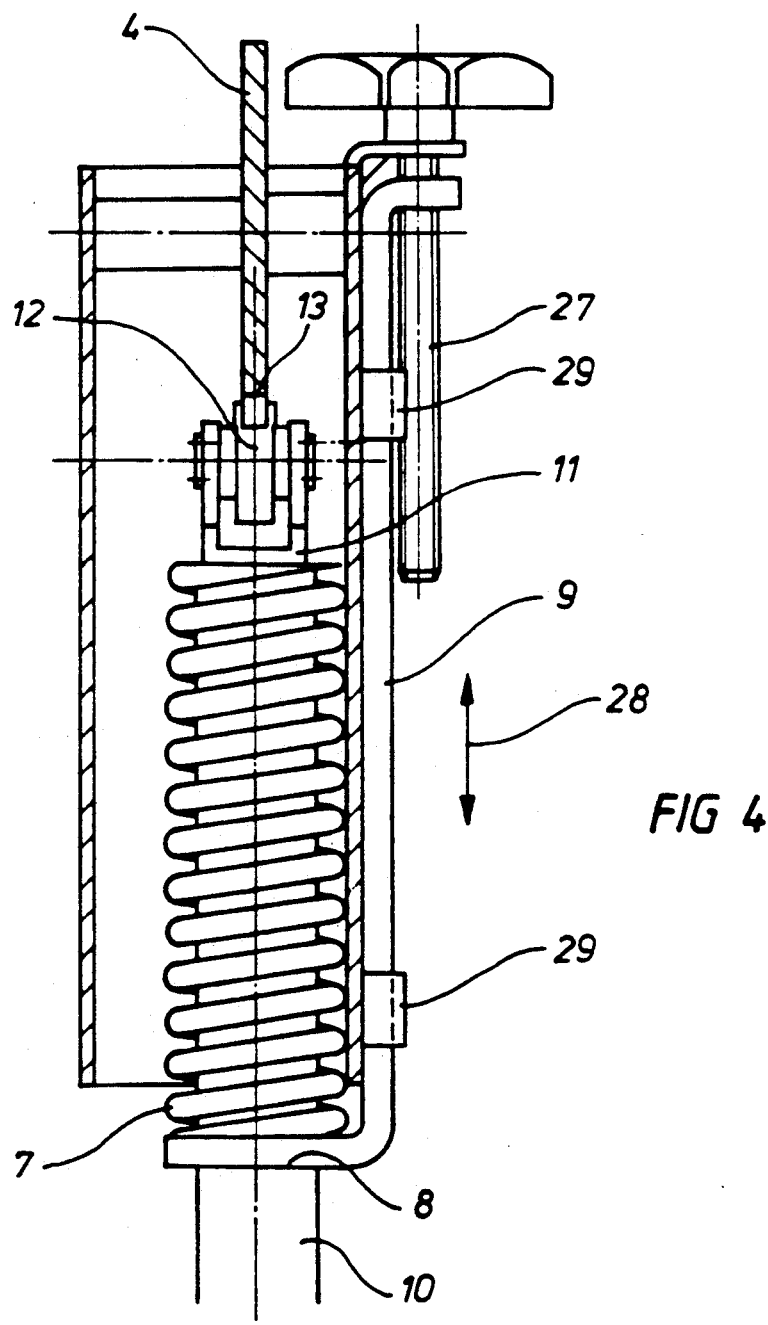
FIG. 4 shows a section along the line A—B in FIG. 3.

FIGS. 3 and 4 also show that the roller 12 is mounted on a lever 25 that swivels on a non-turning spindle 26 so that it can assume the operating positions shown in the drawings. The lever is provided instead of the longitudinal guideway.

The tension of the spring 7 can be adjusted with the mechanism shown in FIG. 4 and comprising a tensioning bolt 27 that permits displacement of the angle plate 9 in the direction of the arrow 28. This adjusts the position of the flange 8 accordingly as well as the compression force of the spring 7. Fixed tangs 29 guiding the angle plate 9 are used for this purpose.

The means shown in FIG. 3 can also act on the bottom lever 4, which must then be provided with a corresponding cam.

The present invention also includes motor, electromagnetic (with lifting magnet), pneumatic, and hydraulic drivers of the means as a whole.

What is claimed is:

1. A device for swivelling a utensil receptacle mountable on a rear wall above a working panel comprising:
   a parallelogram linkage having a cam and adapted to swivel a utensil receptacle in parallel positions between a swivelled-up position above a working panel adjacent a rear wall and a swivelled-down position on a working panel; and
   a spring loaded roller in rolling engagement with the cam of the parallelogram linkage,
   wherein said cam is rotatable about a fulcrum and the cam and roller are arranged so that the momentary distance between the point of engagement between the roller and the cam and the fulcrum of the cam first increases and then decreases when the parallelogram linkage is swivelled down from its swivelled-up position.

2. The device as claimed in claim 1 further comprising a utensil receptacle connected to the parallelogram linkage and a cover separably connected to the utensil receptacle by connector means and adapted to swivel with the utensil receptacle.

3. The device as claimed in claim 2 wherein the separable connector means comprises magnet means.

4. The device as claimed in claim 3 wherein the magnet means is pivotally mounted on the utensil receptacle.

5. The device as claimed in claim 4 wherein the magnet means comprises a plurality of magnets spaced from the cover.

6. The device as claimed in claim 5 wherein the separable connector means further comprises a plurality of rollers cooperatively associated with the plurality of magnets.

7. The device as claimed in claim 6 wherein the separable connector means further comprises a two-armed lever pivotally mounted on the utensil receptacle and having an activating end in contact with the cover.

* * * * *